(12) United States Patent
Achez (10) Patent No.: US 9,010,355 B1
(45) Date of Patent: Apr. 21, 2015

(54) EASY-FLOW FLUSHING SYSTEM

(71) Applicant: Bert J. Achez, Topanga, CA (US)

(72) Inventor: Bert J. Achez, Topanga, CA (US)

(\*) Notice: Subject to any disclaimer, the term of this patent is extended or adjusted under 35 U.S.C. 154(b) by 170 days.

(21) Appl. No.: 13/742,125

(22) Filed: Jan. 15, 2013

Related U.S. Application Data (63) Continuation-in-part of application No. 13/270,302, filed on Oct. 11, 2011.

(51) Int. Cl.
| | |
|---|---|
| *F16K 51/00* | (2006.01) |
| *F16L 37/40* | (2006.01) |
| *F01P 3/20* | (2006.01) |
| *B08B 3/04* | (2006.01) |
| *F01P 11/04* | (2006.01) |

(52) U.S. Cl.
CPC . *F01P 3/205* (2013.01); *B08B 3/04* (2013.01); *F01P 11/04* (2013.01); *F16L 37/40* (2013.01)

(58) Field of Classification Search
CPC .......... F01P 3/205; F01P 11/04; F16L 37/40; B08B 3/04
USPC ....... 137/238, 240, 798; 251/149.1; 440/88 N
See application file for complete search history.

(56) References Cited

U.S. PATENT DOCUMENTS

| | | | | |
|---|---|---|---|---|
| 5,350,329 | A | \* | 9/1994 | Haman ........................ 440/88 N |
| 6,004,175 | A | \* | 12/1999 | McCoy ........................ 440/88 R |
| 6,006,784 | A | \* | 12/1999 | Tsutsui et al. ............. 251/149.1 |
| 6,027,097 | A | | 2/2000 | Humphreys |
| 7,625,256 | B2 | \* | 12/2009 | Bertino et al. ............. 440/88 N |
| 2009/0029609 | A1 | | 1/2009 | Breece et al. |

\* cited by examiner

*Primary Examiner* — Kevin Lee
(74) *Attorney, Agent, or Firm* — Reginald F Roberts (57) ABSTRACT

A quick and efficient method to flush out engines, and appropriate machinery and tools for carrying out this operation. The machinery/tools are (a) a flange; and (b) a self-sealing quick connect-disconnect male-female coupling that connects to and through the center of the flange, terminates at a specified distance on the interior of a surface ending with threads or barbs or a quick disconnect, and is attached to a y-shaped connector, to provide a liquid to a cooling system for the engine; and (c) a quick connect-disconnect sealing cap.

3 Claims, 7 Drawing Sheets

EASY-FLOW FLUSHING SYSTEM

REFERENCE TO RELATED APPLICATIONS

This application is a continuation-in-part of application Ser. No. 13/270,302, filed Oct. 11, 2011, which is a non-provisional application based on provisional Application No. 61/455,230, filed Oct. 15, 2010.

BACKGROUND OF THE INVENTION

The present invention relates to liquid distribution. More particularly, the invention relates to providing an inlet for a liquid from an exterior location for conveyance to an interior location.

Cooling is a critical phase of engine operation. Cooling water passes through the cylinder heads and block, drawing off heat generated by fuel combustion and engine friction. Proper operation of the cooling system is critical to maintaining satisfactory engine operation and performance. Engines at sea, however, use salt water to do this, which is very corrosive to the out drive and engine parts. Therefore it is imperative to flush a cooling system after each use. Hence, the need for a fast efficient way to flush out the boat or ship without the need to lift the engine cover, deal with shut-off valves, and/or have need for current flush-out equipment placed on the out-drive—which must be watched mindfully during operation.

SUMMARY OF THE INVENTION

In general, the present invention in a first aspect provides an easy-flow valve comprising (a) a tubular body having first and second ends; (b) a quick connect-disconnect first coupling at the first end of the tubular body; (c) a plurality of barbs or threads on surface of the second end of the tubular body, forming a quick connect-disconnect second coupling at the second end of the tubular body; (d) a flange near the first end of the tubular body, for mounting the valve against a flat surface, the flange being connected to the first coupling and to the tubular body near the first end of the tubular body, the flange circumscribing the first coupling and the tubular body; and (e) a lock nut near and circumscribing the second end of the tubular body, for locking and unlocking the easy-flow valve.

In a second aspect the invention provides an easy-flow flushing system for flushing out an engine and out-drive. The system comprises (a) an easy-flow valve comprising a tubular body having first and second ends; a quick connect-disconnect first coupling at the first end of the tubular body, for incoming water; a plurality of barbs or threads on surface of the second end of the tubular body, forming a quick connect-disconnect second coupling at the second end of the tubular body; a flange near the first end of the tubular body, for mounting the valve against a flat surface, the flange being connected to the male coupler of the first coupling and to the tubular body near the first end of the tubular body, the flange circumscribing male coupler of the first coupling and the tubular body; and a lock nut near and circumscribing the second end of the tubular body, for locking and unlocking the easy-flow valve; (b) a first conduit for conveying a portion of water out of the system, flushing out the out-drive, from the easy-flow valve through a y-shaped connector to a second conduit; (c) a first segment of the second conduit, for conveying a portion of the water out of the system; (d) a second segment of the second conduit, for conveying a portion of the water to and through an impeller; and (e) a third conduit, for conveying water to a circulation pump of the engine, for circulation through the engine.

In a third aspect, the invention provides a quick connect-disconnect sealing cap for an easy-flow valve. The sealing cap comprises (a) an open first end; (b) a closed second end, for sealing the cap; (c) an outer surface and an inner surface; (d) a washer disposed at the second end of the sealing cap within the inner surface of the sealing cap; (e) an O-ring disposed within the inner surface near the second end of the sealing cap; (f) a first groove in which the O-ring is seated; (g) a plurality of ball bearings seated in concave openings near the second end of the sealing cap; (h) an outer sleeve surrounding the ball bearings, which float freely in the sleeve; (i) a cylindrical member having an outer surface on which the sleeve slides; (j) a spring surrounding the cylindrical member, for urging the sleeve to a closed or locked configuration; (k) a snap ring disposed in front of and retaining the sleeve; and (l) a second groove, in which the snap ring is seated.

In a fourth aspect the invention provides a male coupler constructed and arranged for connection to a hose and to a mating female coupler for flushing out an engine and out-drive, the male coupler comprising (a) an open first end circumscribed by a groove for locking and unlocking the female coupler to and from the male coupler, thereby forming a quick connect-disconnect coupling; (b) a threaded or barbed open second end constructed and arranged to be connected to a hose for conveying water to flush out the engine and out-drive; and (c) a tubular body connecting the first and second ends of the male coupler to one another; (d) a flange circumscribing the first end of the male coupler, for mounting the male coupler on a flat surface; and (e) a lock nut and a plurality of threads circumscribing the tubular body, to lock and unlock the male coupler to and from the flat surface.

In a fifth aspect, the invention provides a quick connect-disconnect female water-hose coupler. The coupler comprises (a) an open first end; (b) an open interior passageway from the first end to an internally-threaded open second end; (c) an outer surface and an inner surface; (d) a plurality of protuberances at a first end of the outer surface; (e) a plurality of protuberances at a second end of the outer surface, the protuberances at the first and second ends of the outer surface providing a grooved, rough surface for non-slip gripping of the female coupler; (f) a circular surface in the passageway, the surface including an opening through center thereof; (g) a washer on outer rear side of the circular surface; (h) a plurality of threads on interior of back end of the passageway, to accommodate a standard garden-hose connection thereto; (i) an O-ring disposed within inner surface near a first end of the female coupler, for stopping water flow; (j) a first groove in which the O-ring is seated; (k) a plurality of ball bearings seated in concave openings near a second end of the female coupler; (l) an outer sleeve surrounding the ball bearings, which float freely in the sleeve; (m) a cylindrical member having an outer surface on which the sleeve slides; (n) a spring resting against a thicker outside surface of the cylindrical member, for urging the sleeve to a closed or locked configuration; (o) a snap ring disposed in front of and retaining the sleeve; (p) a second groove in which the snap ring is seated; (q) a stop valve for stopping water flow when the coupler is disengaged from the hose; (r) a plurality of openings in the stop valve, allowing water to flow therethrough; (s) an O-ring near the second end of the stop valve, to seal the passageway and to stop water flow therethrough; (t) a cylindrical groove which the O-ring seats into; and (u) a flared end of the stop valve for engaging the valve in an open configuration.

In a sixth aspect the invention provides an easy-flow flushing system for flushing out an engine and out-drive. The system comprises (a) a male coupler constructed and arranged for connection to a hose providing water to the system, the male coupler comprising an open first end circumscribed by a groove for locking and unlocking the male coupler to a female coupler or to a sealing cap, thereby forming a quick connect-disconnect coupling, a threaded open second end constructed and arranged to be connected to a hose for conveying water to flush out the engine and out-drive, a tubular body connecting the first and second ends to one another, a flange circumscribing the first end of the male coupler, for mounting the male coupler on a flat surface, and a lock nut and a plurality of threads circumscribing the tubular body, to lock and unlock the male coupler to and from the flat surface; (b) a quick connect-disconnect female water-hose coupler for connection with the male coupler while flushing out the engine and out-drive, the female coupler comprising an open first end, an open interior front-end passageway to an internally-threaded open second end, an outer surface and an inner surface, a plurality of protuberances at a first end of the outer surface, first and second sets of protuberances at and near a second end of the outer surface, respectively, the protuberances at the first and second ends of the outer surface providing a grooved, rough surface for non-slip gripping of the female coupler, a circular surface in the passageway, the surface including an opening through center thereof, a washer on outer rear side of the circular surface, a plurality of threads on interior of back end of the passageway, to provide means for connecting the hose thereto, an O-ring disposed within the inner surface near a first end of the female coupler, for stopping water flow, a first groove in which the O-ring is seated, a plurality of ball bearings seated in concave openings near the first end of the female coupler, an outer sleeve surrounding the ball bearings, which float freely in the sleeve, a cylindrical member having an outer surface on which the sleeve slides, a spring resting against a thicker outside surface of the cylindrical member, for urging the sleeve to a closed or locked configuration, a snap ring disposed in front of and retaining the sleeve, a second groove in which the snap ring is seated, a stop valve for stopping water flow when the coupler is disengaged from the hose, and a plurality of openings in the stop valve, allowing water to flow therethrough; (c) an O-ring near a second end of the stop valve, to seal off incoming water; (d) a cylindrical groove in which the O-ring seats; (e) a flared end of the stop valve, for engaging the valve in an open configuration; and (f) a quick connect-disconnect sealing cap, for sealing the male coupler except while flushing the engine and out-drive, the sealing cap comprising an open first end, a closed second end for sealing the male coupler, an outer surface and an inner surface, a washer disposed at the second end of the sealing cap, within the inner surface of the sealing cap, an O-ring disposed within the inner surface near the second end of the sealing cap, a first groove in which the O-ring is seated, a plurality of ball bearings seated in concave openings near the first end of the sealing cap an outer sleeve surrounding the ball bearings, which float freely in the sleeve, a cylindrical member having an outer surface on which the sleeve slides, a spring surrounding the cylindrical member, for urging the sleeve to a closed or locked configuration, a snap ring disposed in front of and retaining the sleeve, and a second groove, in which the snap ring is seated.

DETAILED DESCRIPTION OF THE DISCLOSED EMBODIMENTS

Figure 1:
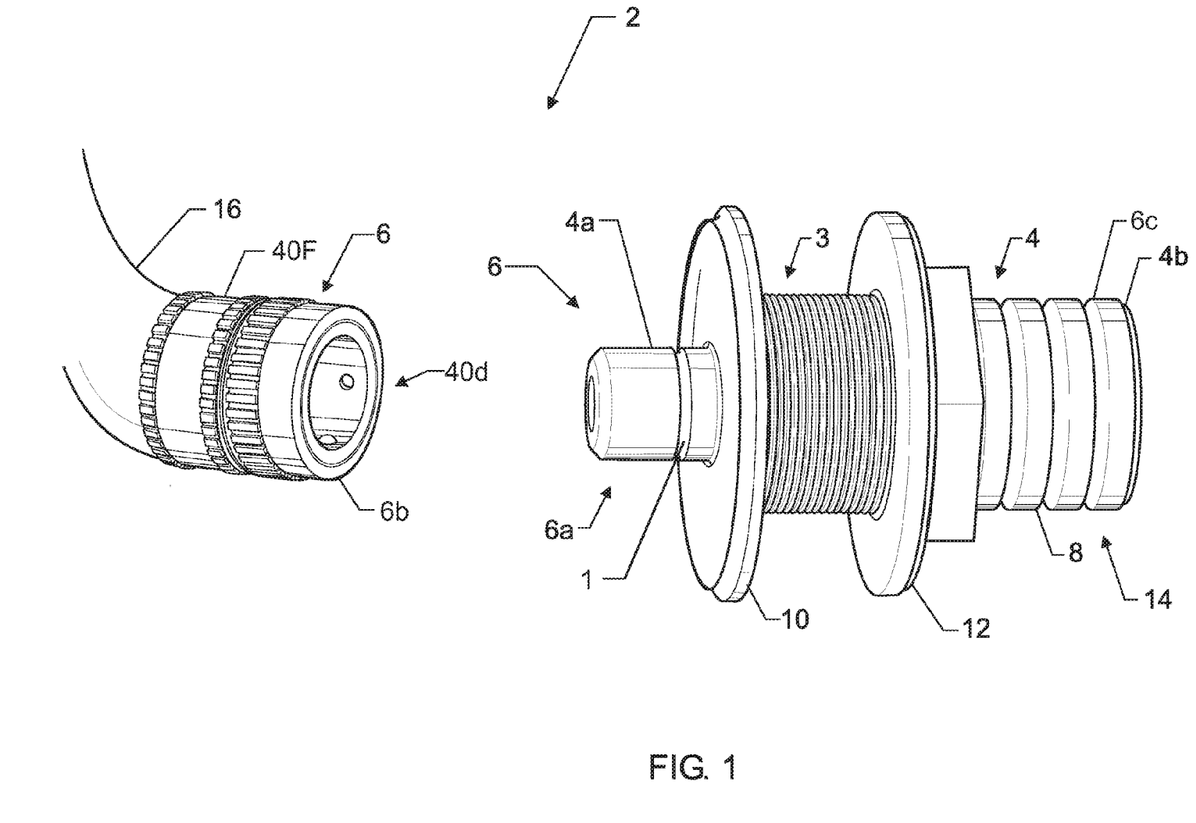
FIG. 1 is a schematic representation of an easy-flow valve, made in accordance with the principles of the present invention, with a hose attached thereto.

More specifically, reference is made to FIG. 1, in which is shown an easy-flow valve, made in accordance with the principles of the present invention, and generally designated by the numeral 2.

The easy-flow valve 2 comprises a tubular body 4 having first and second ends 4a and 4b; a quick connect-disconnect first coupling 6 at the first end 4a of the tubular body 4; a plurality of barbs or threads 8 on the outer surface 6c of the second end 4b of the tubular body 4; a flange 10 near the first end 4a of the tubular body 4; and a lock nut 12 circumscribing the tubular body 4.

The barbs or threads 8 on the outer surface 6c of the tubular body 4 form a quick connect-disconnect second coupling 14 at the second end 4b of the tubular body 4. The flange 10 is for mounting the valve 2 against a flat surface (not shown). Although the flange 10 enables mounting on a flat surface, weld-on or thread-on mounts would not require a flange. The flange 10 is connected to a male coupler 6a of the first coupling 6 and to the tubular body 4 near the first end 4a of the tubular body 4, and circumscribes the back end 6c of a male coupler 6a of the first coupling 6 and the tubular body 4. The lock nut 12 utilizes a plurality of threads 3 to lock and unlock the easy-flow valve 2.

The first coupling 6 has a male coupler 6a and a female coupler 6b, and is thereby self-sealing. The self-sealing capability of the first coupling 6 prevents air from entering a work piece such as a boat engine (not shown) when the valve 2 is being used to service the work piece. During such operation, the first coupling 6 may beneficially be connected to a garden hose 16 for conveying water (not shown) to the easy-flow valve 2. The hose 16 is attached to the threaded end 40f of the female coupler 6b, and the unthreaded end 40d of the female coupler 6b is connected to the easy-flow valve 2 via the male coupler 6a.

Figure 2:
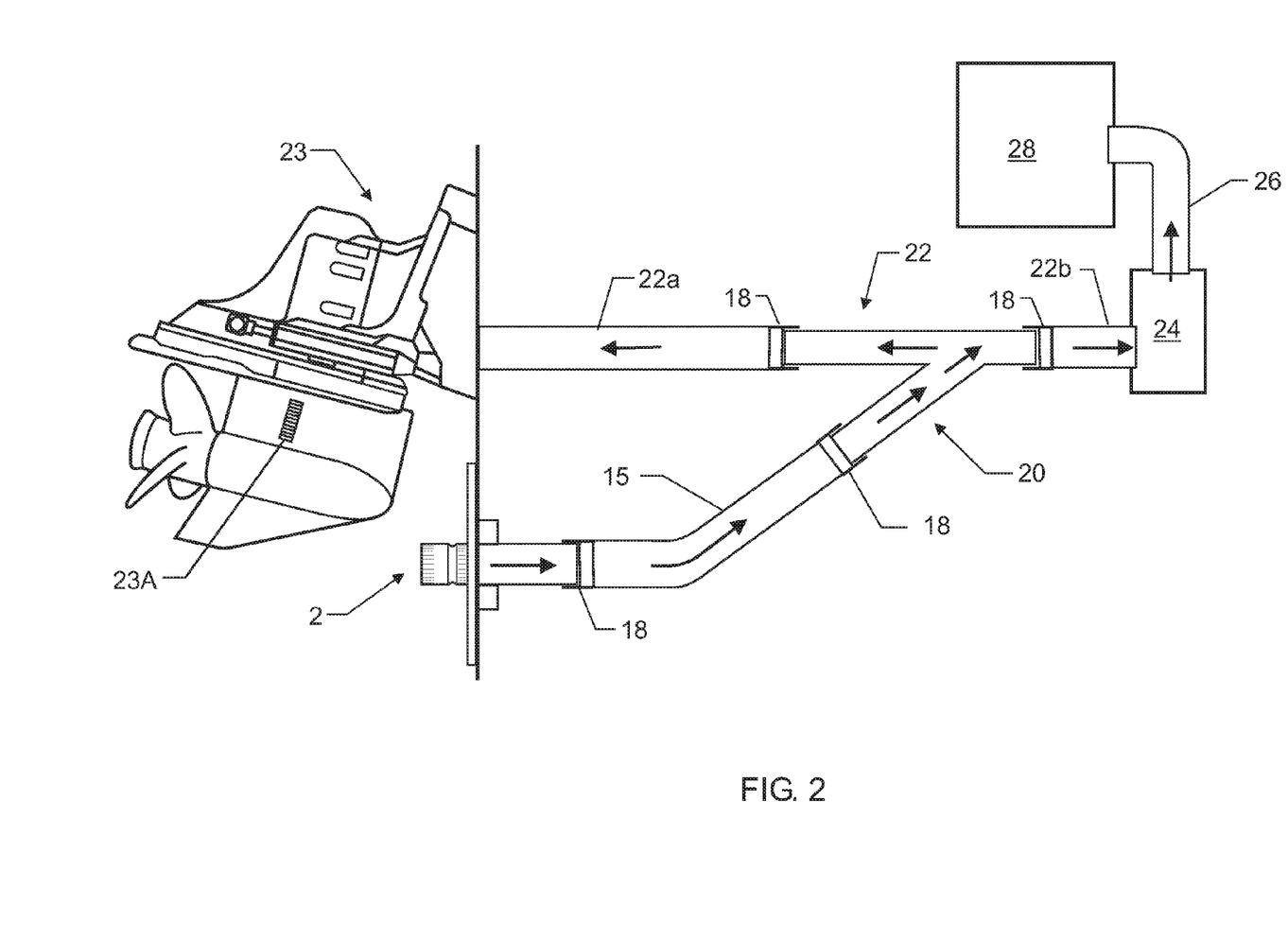
FIG. 2 is a schematic representation of a system for flushing out an engine on a boat, in accordance with the principles of the present invention.

Reference is now made to FIG. 2, in which is shown a system, made in accordance with the principles of the present invention, for flushing out an engine for a boat or ship (not shown).

The system comprises the easy-flow valve 2 shown in detail in FIG. 1, a heavy-duty service hose 15, a plurality of fasteners 18 attached to the hoses 15, 22a, and 22b, a y-shaped connector 20, a first connecting member 22, an impeller 24, and a second connecting member 26. The hose 15 conveys incoming water from the easy-flow valve 2 through the y-shaped connector 20 to the first connecting member 22. With the engine turned off, water flows from and through the first connecting member 22, and out through the out-drive 23 of the system. With the engine running, a portion of the excess water vents out of the system through a first segment 22a of the first connecting member 22, and the greater portion flows in the path of least resistance through a second segment 22b of the first connecting member 22 to and through the impeller 24 and through a second connecting member 26 to a circulation pump 28. Water from the circulation pump 28 is then circulated through the engine on board the boat or ship (not shown). It is important to circulate water through the system with the engine turned alternately off and on, in order to flush the entire system. In order to flush an engine at sea without a pressurized water supply on board, a shutoff valve should be placed between the out-drive inlet 23a and the y-shaped connector 20 to create suction from the easy-flow valve 2 through a hose (not shown) to a fresh-water holding tank (not shown). This procedure could also be used to drain a bilge (not shown).

Figure 3:
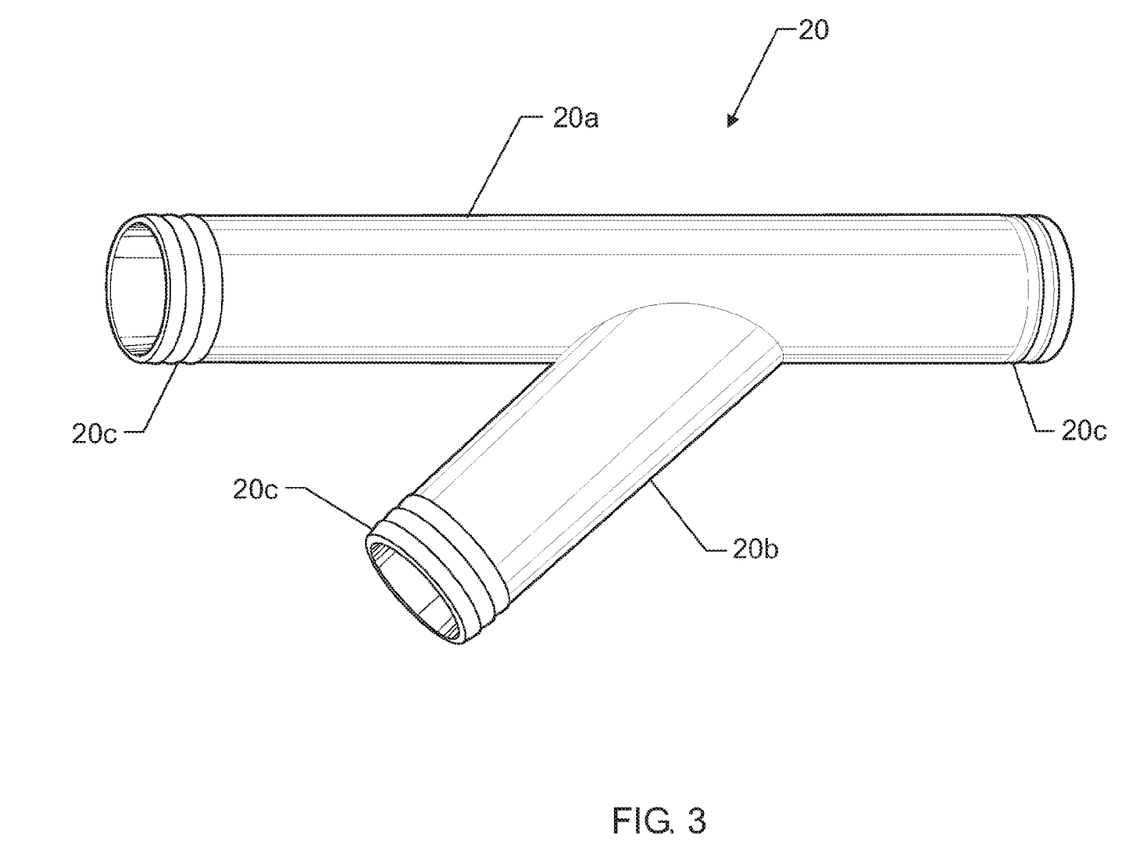
FIG. 3 is a schematic representation of a y-shaped connector equipped with barbs.

The detailed construction of the y-shaped connector 20 is shown in FIG. 3. The y-shaped connector 20 comprises a first segment 20a and a second segment 20b. The first and second segments 20a, 20b define a geometric "y." Each segment 20a and 20b is provided with a plurality of barbs 20c to facilitate connection to the fasteners 18 on the second connecting member 22 shown in FIG. 2.

Figure 4:
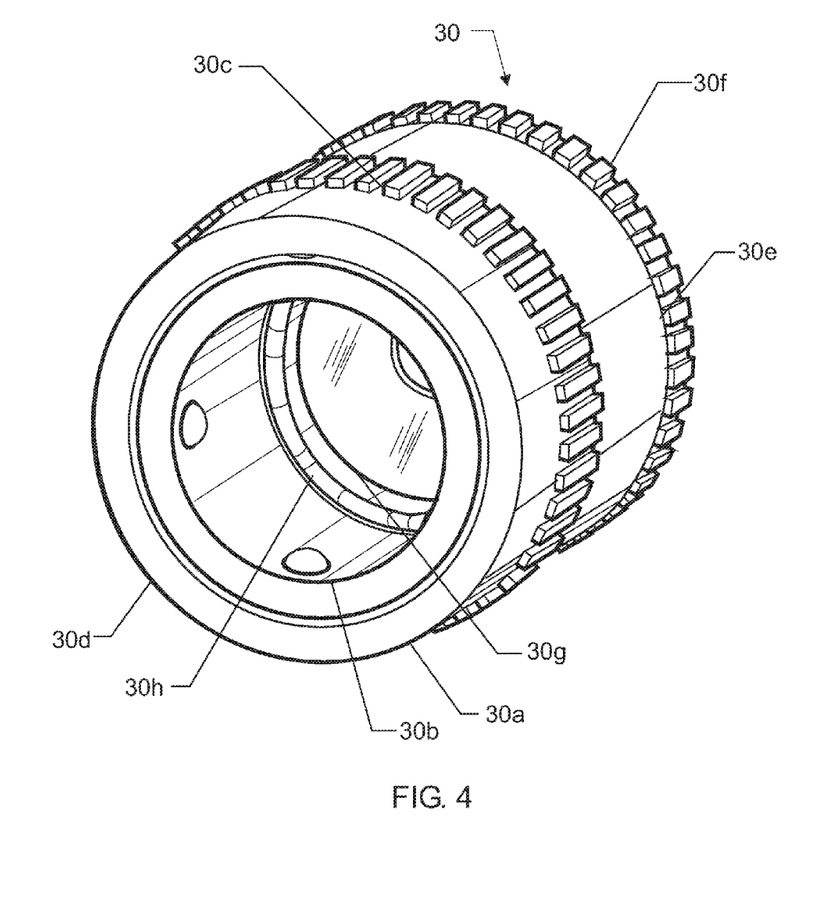
FIG. 4 is a schematic representation of a sealing cap for the easy-flow valve shown in FIG. 1.
Figure 5:
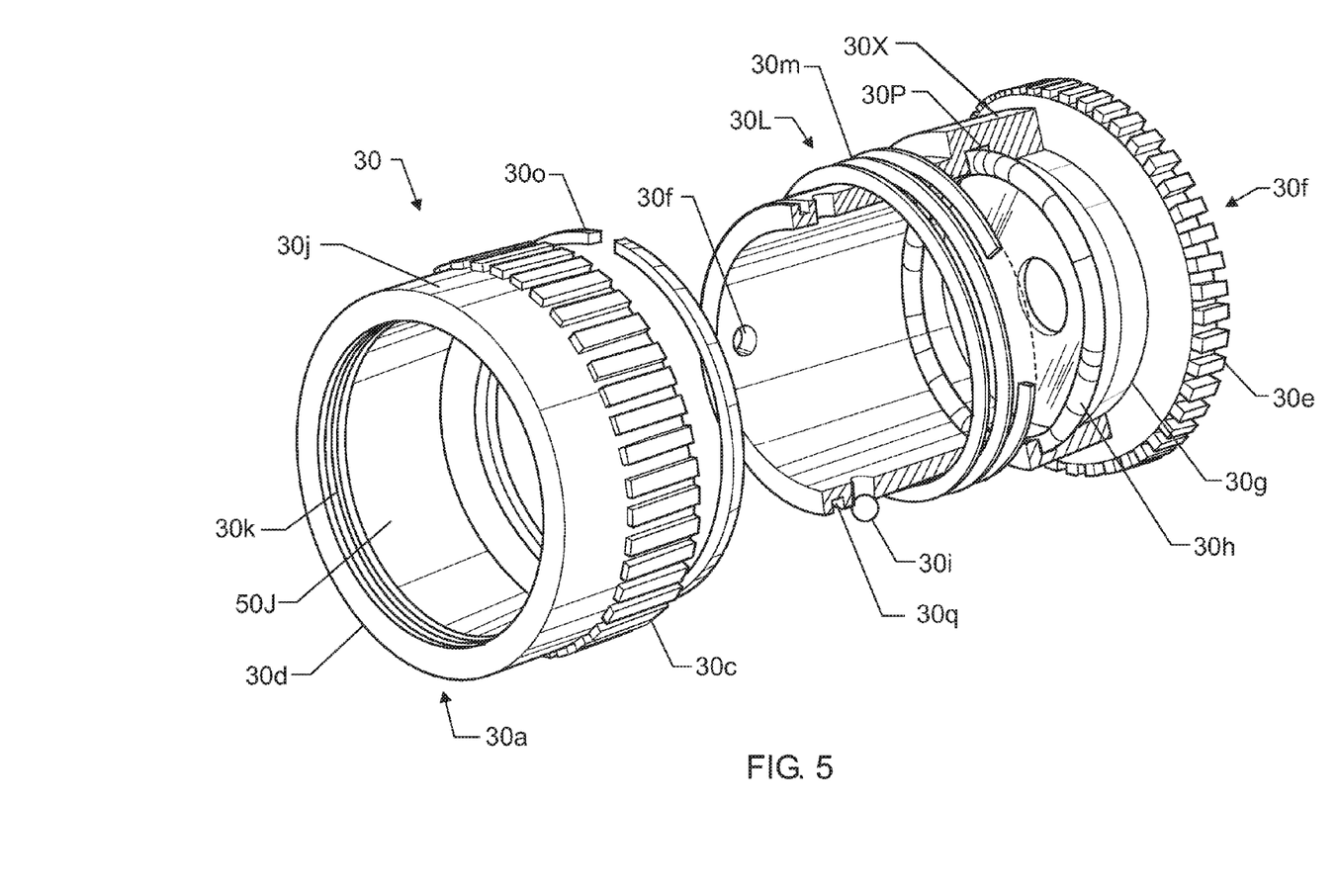
FIG. 5 is an exploded view of the sealing cap shown in FIG. 4.

In FIGS. 4 and 5 is shown a quick connect-disconnect sealing cap, generally designated by the numeral 30, for the easy-flow valve 2 shown in FIG. 1.

The quick connect-disconnect sealing cap 30 pertains to quick connect/disconnect couplings for a standard garden hose. More specifically, the sealing cap 30 caps off the male coupler 6a of the easy-flow valve 2. The cap 30 should remain on the male coupler 6a at all times except during the flushing process. While the system is being flushed, the female coupler 6b is connected to the garden hose 16, FIG. 1, and mated with the male coupler 6a. During this time the male coupler 6a does not need to be capped, because the male coupler 6a is being used as a sealed passageway for water. After being flushed, the engine is turned off, and the cap 30 is replaced on the male coupler 6a using the same procedure as in connecting the female coupler 6b. Usually, the female coupler 6b is connected to a garden hose for spraying down a boat. However, in the case of the present invention, the male coupler 6a of the easy flow valve 2 is used as an inlet to a closed environment, and it is critical that said environment be completely sealed. If the easy-flow valve 2 were used as a liquid inlet to fill a holding tank, an air vent in the system would be required. The cap 30 is an external means of sealing the easy-flow valve 2 shown in FIG. 1 and the system shown in FIG. 2 for flushing out an engine on a boat or ship. If the male coupler 6a is provided with an internal spring disk valve, such a valve restrains water and air from entering by spring pressure, forcing an element back to its seat, and thereby forming an air/water-tight seal. This seal will not open from the suction created by the circulation pump 28, but can be overcome by standard water pressure used to flush out the engine. The cap 30, however, not only seals securely the male coupler 6a of the easy-flow valve 2, but also provides protection from wear and abrasion. Moreover, the cap 30 provides a uniquely efficient and quick way to seal and protect the male coupler 6a of the easy-flow valve 2 without the possibility of the connection becoming loosened. Preferably, a connecting chain (not shown) is attached from the sealing cap 30 to the flange 10, in order to prevent accidental loss of the cap 30.

More specifically, the sealing cap 30 comprises an outer surface 30a and an inner surface 30b. The outer surface 30a is provided with a plurality of protuberances 30c at a first end 30d, and a plurality of smaller protuberances 30e at a second end 30f. The protuberances 30c and 30e provide a grooved, rough surface for non-slip gripping of the sealing cap 30. The first end 30d of the cap 30 is open, and the second end 30f is closed. A washer 30g is disposed at the second end 30f within the inner surface 30b of the quick connect-disconnect sealing cap 30. An O-ring 30h is disposed within the inner surface 30b near the second end 30f of the sealing cap 30, and is seated in a groove 30p. The washer 30g forms a sealed passageway when the male coupler 6a seats against the washer 30g. The male coupler 6a fits tightly in and through the O-ring 30h to form a second seal.

Near the first end 30d of the quick connect-disconnect sealing cap 30, as shown in FIG. 5, are three evenly, circumferentially spaced ball bearings 30i on the front end 30d of the cylindrical member 30l. The ball bearings 30i are seated in concave openings 30r that are smaller than the ball bearings 30i, so that the ball bearings 30i can only partially protrude and cannot fall through the openings 30r. The ball bearings 30i float freely against an outer surrounding sleeve 30j. The inside surface 50j of the sleeve 30j at the front-end 30d of the cylindrical member 30l is tapered, and slides on the outer, thicker surface 30x of the cylindrical member 30l. A spring 30m surrounding the cylindrical member 30l rests against a thicker portion 30x of the cylindrical member 30l, and urges the tapered sleeve 30j to a closed or locked configuration. In this position the inside surface 30k of the tapered sleeve 30j is thickest, causing a downward pressure against the ball bearings 30i, pushing them into a groove 1 (FIG. 1) surrounding the male coupler 6a. There is now a seal at the washer 30g and the O-ring 30h, and the ball bearings 30i are pressed hard, seating them firmly in the openings 30r. The spring 30m keeps the sleeve 30j in a locked configuration. If the sleeve 30j is pulled backward, the ball bearings 30i are disengaged, releasing the male coupler 6a. A snap ring 30o fits in front of and retains the sleeve 30j, and is seated in a groove 30q.

The cap 30 ensures operation of the water-suctioning process created by the impeller 24 and the circulation pump 28 (FIG. 2) without sucking in air, which would cause the engine to overheat. The cap 30 provides a fail-safe mechanism that prevents air, water, and other potential contaminants from being sucked into a boat's cooling system via the male coupler 6a. For a marine application involving boats, brass or stainless-steel coupling should be used. When the cap 30 and the male coupler 6a are mated, the first end 4a of the male coupler 6a presses against the washer 30g at the second end 30f of the cap 30, and seats into the O-ring 30h. This operation completely seals off the male coupler 6a from air and water.

The present invention enables change from flushing out the engine, attaching a nozzle (not shown), and spraying the boat down without turning off the water supply.

Figure 6:
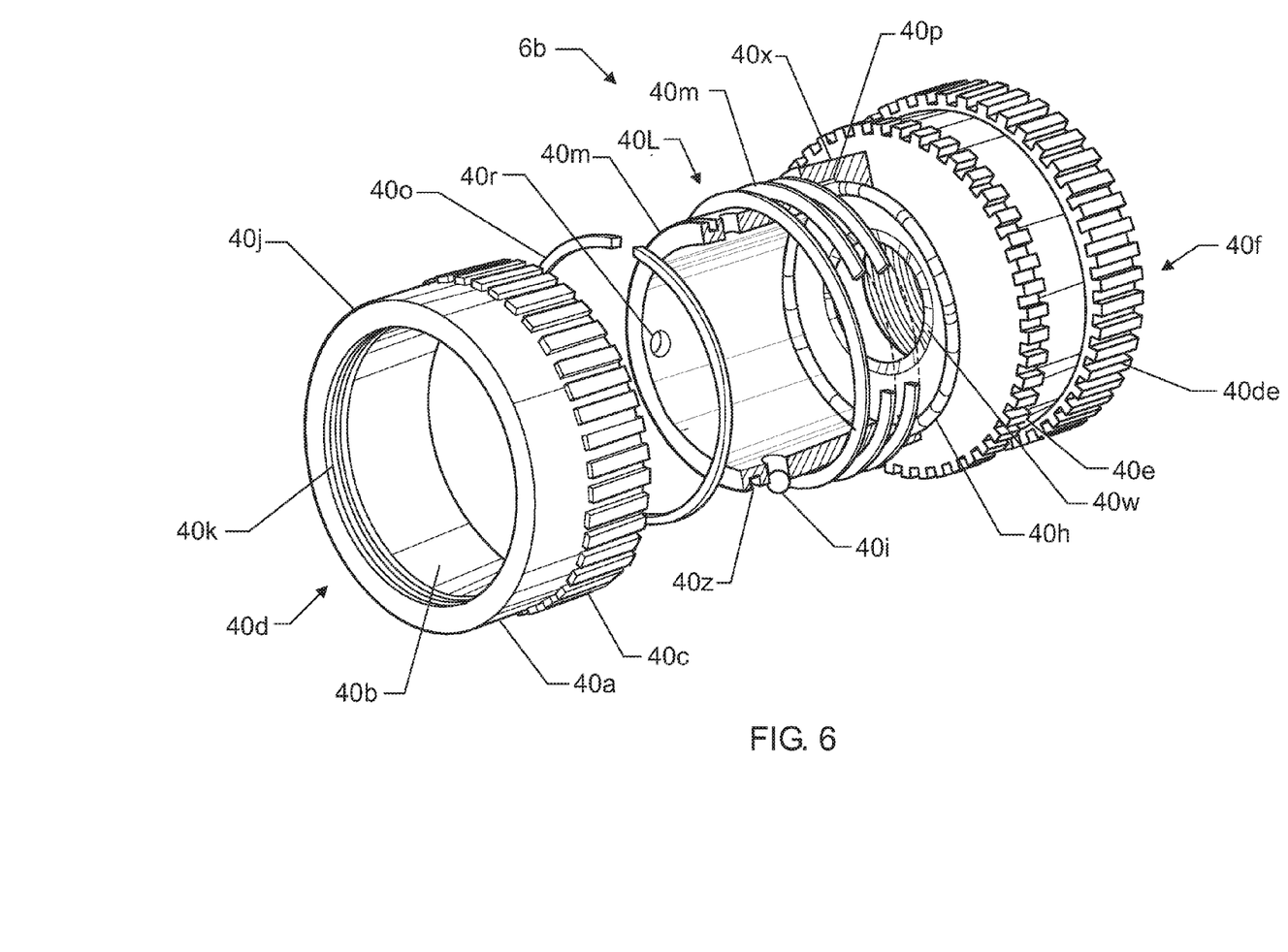
FIG. 6 is a schematic representation of an exploded partial sectional view of a portion of a female coupler.
Figure 7:
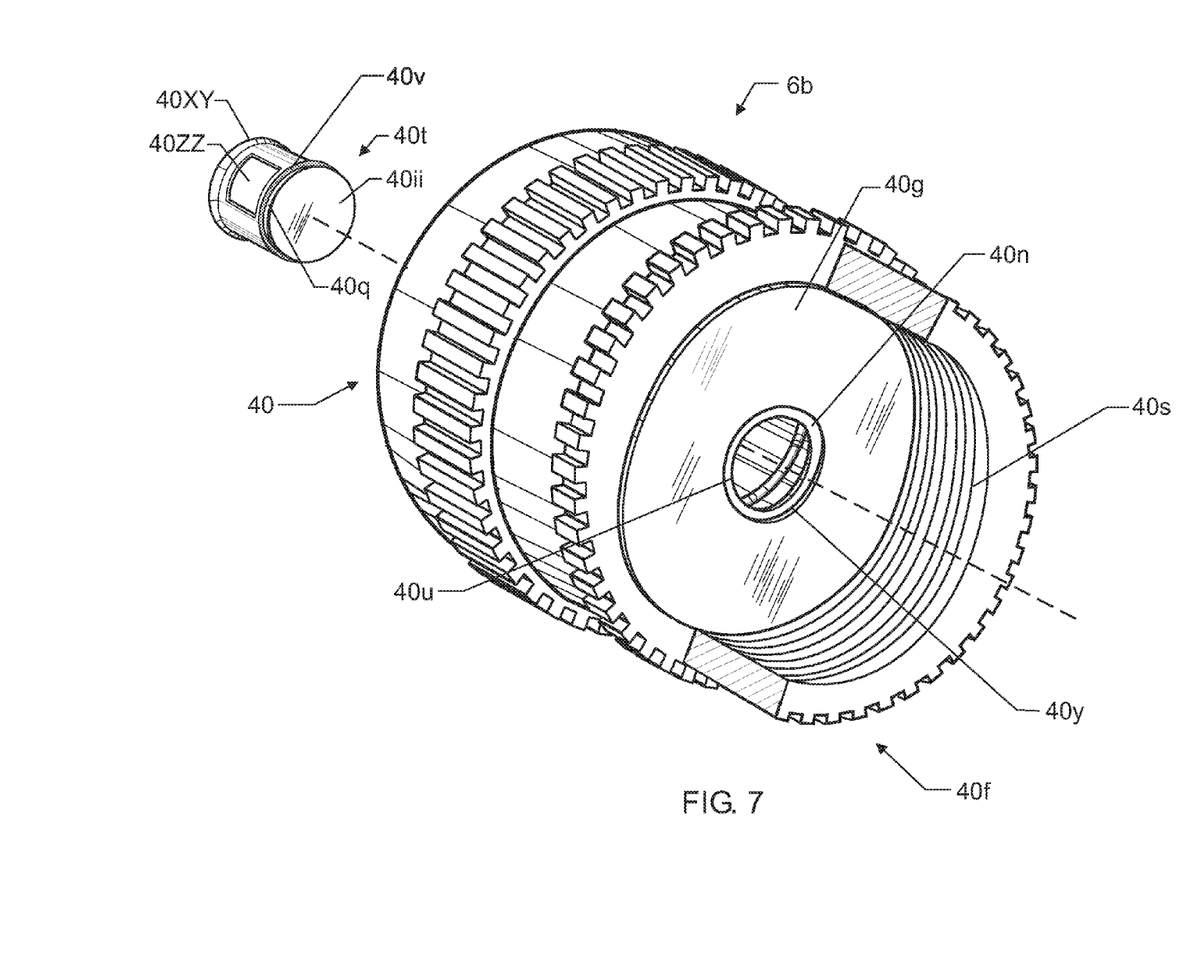
FIG. 7 is a schematic representation of a partial sectional view of the female coupler, shown on the threaded side, with an internal stop valve partially removed, to reveal a flared end.

Reference is now made to FIGS. 6 and 7, in which is shown in detail the female coupler 6b, which provides a threaded inlet 40s to the garden hose 16 shown in FIG. 1, thereby providing water to the male coupler 6a of the easy-flow valve 2. The female coupler 6b comprises an outer surface 40a and an inner surface 40b. The outer surface 40a is provided with two sets of protuberances 40c at a first end 40d, and a plurality of smaller protuberances 40e and 40de at a second end 40f. The protuberances 40c, 40e, and 40de provide a grooved, rough surface for non-slip gripping of the female coupler 6b. The first end 40d of the female coupler 6b is open, and is openly connected to the second end 40f, which is open and provided with internal threads 40s. A washer 40g is disposed at the rear of and on the end side 40f of an interior surface 40n having a circular indented edge 40u and an opening 40w centered in a passageway 40y. An O-ring 40h is disposed within the inner surface 40b near the second end 40f of the female coupler 6b, and is seated in a groove 40p. The washer 40g forms a sealed passageway 40y for water from the garden hose 16. The male coupler 6a fits tightly in and through the O-ring 40h to form a seal for the passageway 40y.

Near the first end 40d of the female coupler 6b are three evenly, circumferentially spaced ball bearings 40i at the front end 40d of the cylindrical member 40l. The ball bearings 40i are seated in concave openings 40r that are smaller than the ball bearings 40i, so that the ball bearings 40i can only partially protrude through the openings 40r. The ball bearings 40i float freely against an outer surrounding sleeve 40j. The inside front-end surface 40k of the sleeve 40j is tapered, and slides on the outer surface of a cylindrical member 40l. A spring 40m surrounding the cylindrical member 40l urges the sleeve 40j to a closed or locked configuration. In this configuration the inside surface 40k of the tapered sleeve 40j is thickest, causing a downward pressure against the ball bearings 40i, pushing them into a groove 1 surrounding the male coupler 6a. There is now a seal at the male coupler 6a and the O-ring 40h, and the ball bearings 40i are pressed hard, seating them firmly in the openings 40r and into the groove 1. The springs 40m rests against a thicker outside surface 40x and around the cylindrical member 40l, thereby keeping the sleeve 40j in a locked configuration. If the sleeve 40j is pushed toward the second end 40f of the female coupler 6b, the ball bearings 40i are disengaged, releasing the male coupler 6a. A snap ring 40o fits in front of and retains the sleeve 40j, and is seated in a groove 40z.

The female coupler 6b includes a sliding water-stop valve 40t. The male coupler 6a fits into the female coupler 6b, forcing the flared first end 40xy of the stop valve 40t to slide toward the back end 40f of the female coupler 6b, and to seat the stop valve 40t against an interior surface 40w. This open configuration allows water to flow through the open cylindrical first end 40xy of stop valve 40t, out through two symmetrical openings 40zz, and out of the passageway 40y. When the male coupler 6a is disengaged, water pressure will force the closed second end 40ii of the stop valve 40t toward the first end 40d of the female coupler 6b. An O-ring 40v seated in a groove 40q near the closed second end 40ii of the stop valve 40t seats into the indented interior edge 40u of the female coupler 6b, thereby closing the passageway 40y.

While certain specific embodiments and details have been described to illustrate the principles of the present invention, it will be apparent to those skilled in the art that many modifications are possible within the scope of the claimed invention.

What is claimed is:

1. A male coupler comprising:
   (a) an open first end circumscribed by a groove for locking and unlocking the male coupler to a female coupler, wherein the male coupler and the female coupler form a quick connect-disconnect coupling;
   (b) a threaded or barbed open second end constructed and arranged to be connected to a hose to convey fluid;
   (c) a tubular body connecting the first and second ends of the male coupler to one another;
   (d) a flange circumscribing the first end of the male coupler, for mounting the male coupler to a surface; and
   (e) a lock nut and a plurality of threads circumscribing the tubular body, to lock and unlock the male coupler to and from another surface.

2. A quick connect-disconnect female coupler, comprising:
   (a) an open first end;
   (b) an open interior front-end passageway to an internally-threaded open second end;
   (c) an outer surface and an inner surface;
   (d) a plurality of protuberances at a first end of the outer surface;
   (e) a plurality of protuberances at a second end of the outer surface, the protuberances at the second end of the outer surface being smaller than the protuberances at the first end of the outer surface, the protuberances at the first and second ends of the outer surface providing a grooved, rough surface for non-slip gripping of the female coupler;
   (f) a circular surface in the passageway, the surface including an opening through center thereof;
   (g) a washer on an outer rear side of the circular surface;
   (h) a plurality of threads on an interior of a back end of the passageway, to accommodate a hose connection thereto;
   (i) an O-ring disposed within inner surface at a first end of the female coupler, for stopping water flow;
   (j) a first groove in which the O-ring is seated;
   (k) a plurality of ball bearings seated in concave openings at the first end of the female coupler;
   (l) an outer sleeve surrounding the ball bearings, which float freely in the sleeve;
   (m) a cylindrical member having an outer surface on which the sleeve slides;
   (n) a spring resting against a thicker outside surface of the cylindrical member, for urging the sleeve to a closed or locked configuration;
   (o) a snap ring disposed in front of and retaining the sleeve;
   (p) a second groove in which the snap ring is seated;
   (q) a stop valve for stopping water flow when the female coupler is disengaged from the hose;
   (r) a plurality of openings in the stop valve, allowing fluid flow therethrough;
   (s) an O-ring at the second end of the stop valve, to seal with a male coupler;
   (t) a cylindrical edge which the O-ring rests against;
   (u) a circular indented edge in which the O-ring seats; and
   (v) a flared end of the stop valve switchable between an open and a closed configuration.

3. An easy-flow flushing system comprising:
   (a) a male coupler constructed and arranged for connection to a hose providing water to the system, the male coupler comprising an open first end circumscribed by a groove for locking and unlocking the male coupler to a female coupler or to a female coupler or to a sealing cap, thereby forming a quick connect-disconnect coupling, a threaded open second end constructed and arranged to be connected to a hose for conveying fluid, a tubular body connecting the first and second ends to one another, a flange circumscribing the first end of the male coupler, for mounting the male coupler on a flat surface, and a lock nut and a plurality of threads circumscribing the tubular body, to lock and unlock the male coupler to and from the flat surface;
   (b) a quick connect-disconnect female water-hose coupler for connection with the male coupler, the female coupler comprising an open first end, an open interior front-end passageway to an internally-threaded open second end, an outer surface and an inner surface, a plurality of protuberances at a first end of the outer surface, a plurality of protuberances at a second end of the outer surface, the protuberances at the second end of the outer surface being smaller than the protuberances at the first end of the outer surface, the protuberances at the first and second ends of the outer surface providing a grooved, rough surface for non-slip gripping of the female coupler, a circular surface in the passageway, the surface including an opening through center thereof, a washer on an outer rear side of the circular surface, a plurality of threads on an interior of a back end of the passageway, to provide means for connecting the hose thereto, an O-ring disposed within the inner surface at a first end of the female coupler, for stopping fluid flow, a first groove in which the O-ring is seated, a plurality of ball bearings seated in concave openings at the first end of the female coupler, an outer sleeve surrounding the ball bearings, which float freely in the sleeve, a cylindrical member having an outer surface on which the sleeve slides, a spring resting against a thicker outside surface of the cylindrical member, for urging the sleeve to a closed or locked configuration, a snap ring disposed in front of and retaining the sleeve, a second groove in which the snap ring is seated, a stop valve for stopping water flow when the coupler is disengaged from the hose, and a plurality of openings in the stop valve, allowing water to flow therethrough; an O-ring at the second end of the stop valve, to seal with a male coupler; a cylindrical edge which the O-ring rests against; and a flared end of the stop valve switchable between an open and a closed configuration; and (c) a quick connect-disconnect sealing cap, for sealing the male coupler, the sealing cap comprising an open first end, a closed second end for sealing the male coupler, an outer surface and an inner surface, a washer disposed at the second end of the sealing cap, within the inner surface of the sealing cap, an O-ring disposed within the inner surface at the second end of the sealing cap, a first groove in which the O-ring is seated, a plurality of ball bearings seated in concave openings at the first end of the sealing cap an outer sleeve surrounding the ball bearings, which float freely in the sleeve, a cylindrical member having an outer surface on which the sleeve slides, a spring surrounding the cylindrical member, for urging the sleeve to a closed or locked configuration, a snap ring disposed in front of and retaining the sleeve, and a second groove, in which the snap ring is seated.

* * * * *